US006555813B1

(12) United States Patent
Beecher et al.

(10) Patent No.: US 6,555,813 B1
(45) Date of Patent: Apr. 29, 2003

(54) PROBES WITH HYDROPHOBIC COATINGS FOR GAS PHASE ION SPECTROMETERS

(75) Inventors: Jody Beecher, San Jose, CA (US); Frank Scheufele, Palo Alto, CA (US); Kamen Voivodov, Hayward, CA (US); Scot Weinberger, Montara, CA (US); William Landgraf, Palo Alto, CA (US)

(73) Assignee: Ciphergen Biosystems, Inc., Fremont, CA (US)

( * ) Notice: Subject to any disclaimer, the term of this patent is extended or adjusted under 35 U.S.C. 154(b) by 0 days.

(21) Appl. No.: 09/561,604

(22) Filed: Apr. 27, 2000

Related U.S. Application Data

(60) Provisional application No. 60/131,653, filed on Apr. 29, 1999.

(51) Int. Cl.[7] ................................................ G01N 21/75

(52) U.S. Cl. ....................... 250/281; 250/282; 250/288; 436/178

(58) Field of Search ................................ 250/281, 282, 250/288; 436/178

(56) References Cited

U.S. PATENT DOCUMENTS

| | | | | |
|---|---|---|---|---|
| 5,041,266 A | | 8/1991 | Fox | |
| 5,045,694 A | | 9/1991 | Beavis et al. | |
| 5,118,937 A | | 6/1992 | Hillenkamp et al. | |
| 5,625,184 A | | 4/1997 | Vestal et al. | |
| 5,719,060 A | | 2/1998 | Hutchens et al. | |
| 5,821,063 A | | 10/1998 | Patterson et al. | |
| 5,831,184 A | | 11/1998 | Willard et al. | |
| 5,859,431 A | | 1/1999 | Cotrell et al. | |
| 5,869,240 A | | 2/1999 | Patterson | |
| 6,124,137 A | * | 9/2000 | Hutchens et al. | 436/155 |
| 6,210,894 B1 | | 4/2001 | Brennan | |
| 6,329,209 B1 | | 12/2001 | Wagner et al. | |

FOREIGN PATENT DOCUMENTS

| | | |
|---|---|---|
| DE | 197 54 978 A1 | 7/1999 |
| WO | WO 97/09608 A1 | 3/1997 |
| WO | WO 98/41323 A1 | 9/1998 |
| WO | WO 98/59361 A1 | 12/1998 |
| WO | WO 99/40610 A2 | 8/1999 |

OTHER PUBLICATIONS

Blackledge, J. and Alexander, A., "Polyethylene Membrane as a Sample Support for Direct Matrix–Assisted Laser Desorption/Ionization Mass Spectrometric Analysis of High Mass Proteins," *Analytical Chemistry* 67(5): 843–848 (Mar. 1, 1995).

Brockman, A. *et al.*, "A Desalting Approach for MALDI–MS Using On–Probe Hydrophobic Self–Assembled Monolayers," *Anal. Chem.* 69:4716–4720 (1997).

(List continued on next page.)

*Primary Examiner*—Bruce Anderson
*Assistant Examiner*—Nikita Wells
(74) *Attorney, Agent, or Firm*—Townsend and Townsend and Crew LLP

(57) ABSTRACT

This invention provides a mass spectrometry probe including a substrate having a surface and a film that coats the surface. The film includes openings that define features for the presentation of an analyte. The film also has a lower surface tension that the surface tension of the substrate surface, and has a water contact angle between 120° and 180°.

24 Claims, 1 Drawing Sheet

U.S. PATENT DOCUMENTS

Hung, K. *et al.*, "Use of Paraffin Wax Film in MALDI–TOF Analysis of DNA," *Analytical Chemistry* 70: 3088–3093 (Jul. 15, 1998).
Hung, K. *et al.*, "Use of Poly(tetrafluroroethylene)s as a sample support for MALDI–TOF analysis of DNA and proteins," *Analytical Chemistry* 71(2): 518–21 (Jan. 15, 1999).
Stevenson, T.I., and Loo, J.A. "Analysis of Oligonucleotide And Protein Sample Using Membranes And Matrix–Assisted Laser Desorption/Ionization Mass Spectrometry," *Proceedings of the* 43*rd ASMS Conference on Mass Spectrometry and Allied Topics*, p. 934 (1995).
Stevenson, T. *et al.*, "Coupling capillary high–performance liquid chromatography to matrix–assisted laser desorption/ionization mass spectrometry and N–terminal sequencing of peptides via automated microblotting onto membrane substrates," *Analytical Biochemistry* 262(2): 99–109 (1998).
37 C.F.R. § 132 Dec. from Scot Weinberger.
37 C.F.R. § 132 Dec of Lisa Bradbury.
"*Winners of the* 1996 *DuPont Plunkett Student Awards For Innovation With Teflon*®," © 1995, 1996 [online], [retrieved on Mar. 27, 2001]. Retrieved from the Internet: <www.dupont.com/corp/whats–new/releases/plunkwinners.html>, pp. 6 and 7 out of 8.
Zaluzec, E. *et al.*, "Direct Matrix–Assisted Laser Desorption Ionization Mass Spectrometric Analysis of Proteins Immobilized on Nylon–Based Membranes," *J. Am. Soc. Mass Spectrom.* 5: 230–237 (1994).

* cited by examiner

PROBES WITH HYDROPHOBIC COATINGS FOR GAS PHASE ION SPECTROMETERS

CROSS-REFERENCES TO RELATED APPLICATIONS

This application claims priority to provisional application U.S. Ser. No. 60/131,652, filed Apr. 29, 1999, the disclosure of which is herein incorporated by reference in its entirety.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention is directed to the field of mass spectrometry and, more particularly, to sample probes with hydrophobic coatings for improved sequestration of a liquid sample to a probe feature.

Modern laser desorption/ionization mass spectrometry ("LDI-MS") can be practiced in two main variations: matrix assisted laser desorption/ionization ("MALDI") mass spectrometry and surface-enhanced laser desorption/ionization ("SELDI"). In MALDI, the analyte, which may contain biological molecules, is mixed with a solution containing a matrix, and a drop of the liquid is placed on the surface of a probe. The matrix solution then co-crystallizes with the biological molecules. The probe is inserted into the mass spectrometer. Laser energy is directed to the probe surface where it desorbs and ionizes the biological molecules without significantly fragmenting them. However, MALDI has limitations as an analytical tool. It does not provide means for fractionating the sample, and the matrix material can interfere with detection, especially for low molecular weight analytes. See, e.g., U.S. Pat. No. 5,118,937 (Hillenkamp et al.), and U.S. Pat. No. 5,045,694 (Beavis & Chait).

In SELDI, the probe surface is modified so that it is an active participant in the desorption process. In one variant, the surface is derivatized with affinity reagents that selectively bind the analyte. In another variant, the surface is derivatized with energy absorbing molecules that are not desorbed when struck with the laser. In another variant, the surface is derivatized with molecules that bind the analyte and that contain a photolytic bond that is broken upon application of the laser. In each of these methods, the derivatizing agent generally is localized to a specific location on the probe surface where the sample is applied. See, e.g., U.S. Pat. No. 5,719,060 (Hutchens & Yip) and WO 98/59361 (Hutchens & Yip).

The two methods can be combined by, for example, using a SELDI affinity surface to capture an analyte and adding matrix-containing liquid to the captured analyte to provide the energy absorbing material.

In the practice of mass spectrometry, localizing the sample on the probe surface provides advantages. Localization provides more concentrated sample at the point of laser application. In the affinity version of SELDI, localization can be important because it allows the affinity reagent to capture more of the analyte, thereby providing greater sensitivity of detection. However, liquid samples tend to spread out over the surface of the probe, thwarting localization. This especially creates problems when the probe is designed to hold multiple samples and the samples cannot be sequestered to specific locations.

There is a need for better means for sequestering a liquid sample to a location on a probe surface.

SUMMARY OF THE INVENTION

This invention provides a mass spectrometry probe capable of sequestering liquid samples to specific locations, or features, of the probe surface. The probes comprise a substrate having a surface and a film that coats the surface. In general, samples used in mass spectrometry are dissolved in aqueous solutions. Therefore, the film is selected to be more hydrophobic than the surface (lower surface tension).

These coatings provide several advantages compared with mechanical borders. First, they avoid electrical field perturbations that hamper mass resolving power and mass accuracy. Second, they avoid areas of possible sample pooling and preferential crystallization in regions other than the probed area. Third, they avoid the need for maintaining strict mechanical tolerances such as in the case of elevated sample ridges or depressed sample wells, which can result in poor molecular weight determination accuracy and precision. Fourth, they avoid, unlike elevated margins, an optical stop which limits the probed area.

One solution to the problem that is not as effective involves manually applying a hydrophobic circle to the probe surface. The circle can be applied using a PAP pen, available from Polysciences (Warrington, Pa., USA). The PAP pen includes a hydrophobic material in an organic solvent base contained in a stylus. The coating is applied by drawing an enclosed line with the stylus on the substrate surface. The material delivered by the PAP pen has a contact angle of about 90°.

In one aspect this invention provides a probe that is removably insertable into a gas phase ion detector (e.g., a mass spectrometer) comprising: a) a substrate having a surface adapted to present an analyte to an ionization source and b) a film that coats the surface, wherein the film: i) comprises at least one opening that exposes the surface, thereby defining a feature for applying a liquid comprising an analyte; ii) has a water contact angle of between 120° and 180°; and iii) has less surface tension than the substrate surface, whereby a liquid applied to the feature is sequestered in the feature.

In another aspect this invention provides a system comprising: a gas phase ion detector comprising an inlet port; and a probe of this invention inserted into the inlet port.

In another aspect this invention provides a method of detecting an analyte comprising: a) placing the analyte on a feature of a surface of a probe of this invention; b) inserting the probe into an inlet port of a gas phase ion detector comprising: i) an ionization source that desorbs the analyte from the probe surface into a gas phase and ionizes the analyte; and ii) an ion detector in communication with the probe surface that detects desorbed ions; c) desorbing and ionizing the analyte with the ionization source; and d) detecting the ionized analyte with the ion detector.

DETAILED DESCRIPTION OF THE INVENTION

I Definitions

Figure 1:
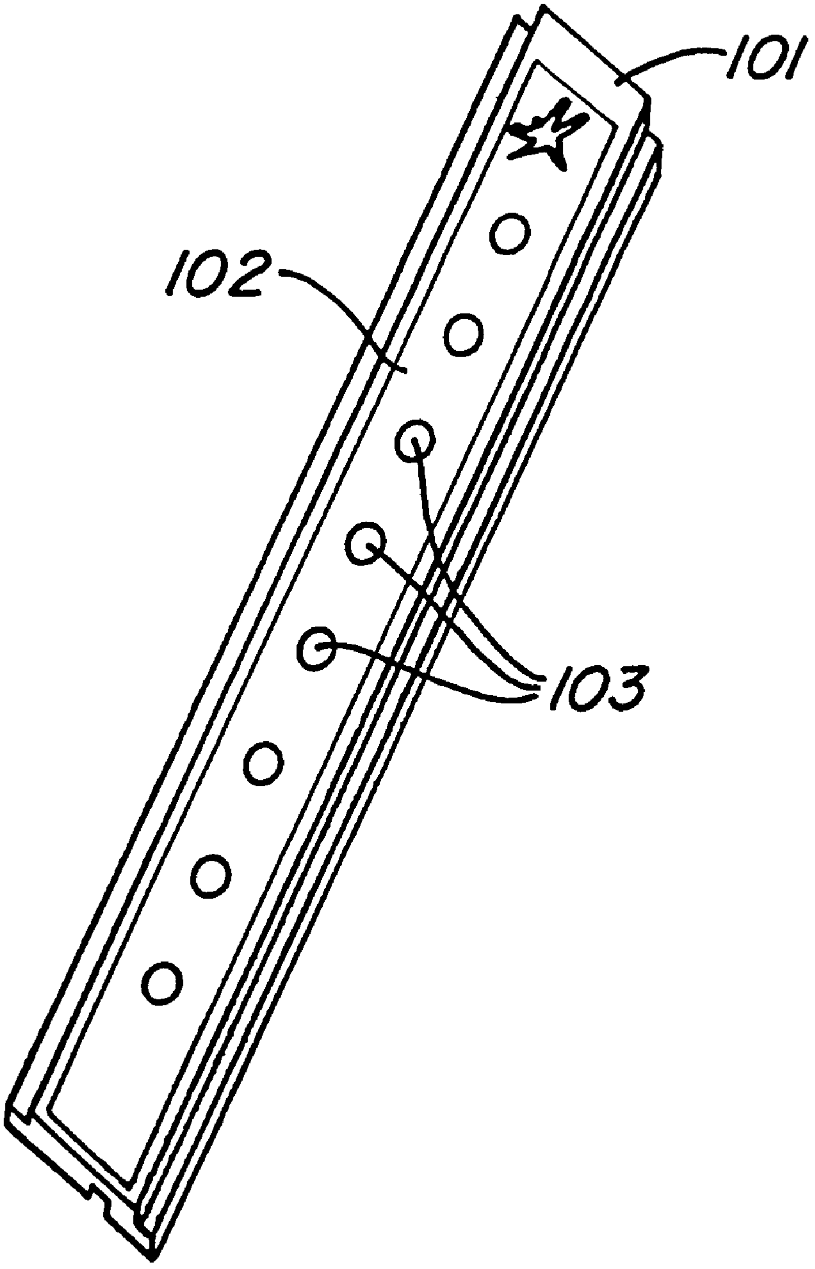
FIG. 1 shows a sample mass spectrometry probe of this invention.

Unless defined otherwise, all technical and scientific terms used herein have the meaning commonly understood by a person skilled in the art to which this invention belongs. The following references provide one of skill with a general definition of many of the terms used in this invention:

Singleton et al., *Dictionary of Microbiology and Molecular Biology* (2nd ed. 1994); *The Cambridge Dictionary of Science and Technology* (Walker ed., 1988); *The Glossary of Genetics,* 5th Ed., R. Rieger et al. (eds.), Springer Verlag (1991); and Hale & Marham, *The Harper Collins Dictionary of Biology* (1991). As used herein, the following terms have the meanings ascribed to them unless specified otherwise.

"Gas phase ion spectrometer" refers to an apparatus that measures a parameter which can be translated into mass-to-charge ratios of ions formed when a sample is ionized into the gas phase. Generally ions of interest bear a single charge, and mass-to-charge ratios are often simply referred to as mass.

"Mass spectrometer" refers to a gas phase ion spectrometer that includes an inlet system, an ionization source, an ion optic assembly, a mass analyzer, and a detector.

"Laser desorption mass spectrometer" refers to a mass spectrometer which uses laser as an ionization source to desorb an analyte.

"Probe" refers to a device that is removably insertable into a gas phase ion detector (e.g., a mass spectrometer) that comprises a substrate having a surface adapted for the presentation of an analyte for detection. The probes may be modified as a result of the analysis and may be disposable.

"Substrate" refers to a solid material that is capable of supporting an analyte.

"Surface" refers to the exterior or upper boundary of a body or a substrate.

"Film" refers to thin coating of a polymeric material or a molecular organic material (e.g., a Langmuir-Blodgett film or a self-assembling monomer).

"Surface tension" refers to the reversible work required to create a unit surface area at constant temperature and pressure and composition. Surface tension is measured by: g=(dG/dA)T,P,n where g=the surface tension; G=Gibbs free energy of the system; A=surface area; T=temperature; P=pressure; and N=composition.

"Contact angle" refers to the angle between the plane of the solid surface and the tangential line to the liquid boundary originating at the point of three phase contact (solid/liquid/vapor).

"Strip" refers to a long narrow piece of a material that is substantially flat or planar.

"Plate" refers to a thin piece of material that is substantially flat or planar, and it can be in any suitable shape (e.g., rectangular, square, oblong, circular, etc.).

"Substantially flat" refers to a substrate having the major surfaces essentially parallel and distinctly greater than the minor surfaces (e.g., a strip or a plate).

"Electrically conducting" refers a material that is capable of transmitting electricity or electrons.

"Adsorbent" refers to a material comprising binding functionalities that adsorb analytes.

"Binding functionalities" refer to functional group(s) of that bind analytes. Binding functionalities can include, but are not limited to, a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, derivatives thereof, or any combinations thereof. Binding functionalities can further include other functionalities that can bind analytes based on individual structural properties, such as the interaction of antibodies with antigens, enzymes with substrate analogs, nucleic acids with binding proteins, and hormones with receptors.

"Analyte" refers to a component of a sample which is desirably detected. The term can refer to a single component or a set of components in the sample.

"Adsorb" refers to the detectable binding between binding functionalities and an analyte either before or after washing with an eluant (selectivity threshold modifier).

"Resolve," "resolution," or "resolution of analyte" refers to the detection of at least one analyte in a sample. Resolution includes the detection of a plurality of analytes in a sample by separation and subsequent differential detection. Resolution does not require the complete separation of an analyte from all other analytes in a mixture. Rather, any separation that allows the distinction between at least two analytes suffices.

"Detect" refers to identifying the presence, absence or amount of the object to be detected.

"Energy absorbing molecule" or "EAM" refers to a molecule that absorbs energy from an energy source in a mass spectrometer thereby enabling desorption of analyte from a probe surface. Energy absorbing molecules used in MALDI are frequently referred to as "matrix." Cinnamic acid derivatives, sinapinic acid and dihydroxybenzoic acid are frequently used as energy absorbing molecules in laser desorption of bioorganic molecules. See U.S. Pat. No. 5,719,060 (Hutchens & Yip) for additional description of energy absorbing molecules.

II. Probes

This invention provides probes that are removably insertable into a mass spectrometer. The probes comprise a substrate having a surface and a film that coats the surface and comprises openings that expose the surface. The film has a water contact angle of between 120° and 180°. The film also has lower surface tension than the substrate surface, so that liquid applied to the exposed areas tend to be sequestered in those areas. In certain embodiments the coatings of this invention are significantly more hydrophobic than coatings that can be applied manually.

A. Substrate

The substrate can be made from any suitable material that is capable of supporting a film and the sample. For example, the substrate material can include, but is not limited to, glass, ceramic (e.g., titanium oxide, silicon oxide), organic polymers, metals (e.g., nickel, brass, steel, aluminum, gold), paper, a composite of metal and polymers, or combinations thereof.

The substrate can have various properties. The substrates generally are non-porous, e.g., solid, and substantially rigid to provide structural stability. Furthermore, the substrate can be electrically insulating or conducting. In a preferred embodiment, the substrate is electrically conducting to reduce surface charge and to improve mass resolution. Electrical conductivity can be achieved by using materials, such as electrically conductive polymers (e.g., carbonized polyetheretherketone, polyacetylenes, polyphenylenes, polypyrroles, polyanilines, polythiophenes, etc.), or conductive particulate fillers (e.g., carbon black, metallic powders, conductive polymer particulates, fiberglass-filled plastics/polymers, elastomers, etc.).

The substrate can be in any shape as long as it allows the probe to be removably insertable into a mass spectrometer. In one embodiment, the substrate is substantially flat and substantially rigid. Typically, a probe can take the shape of a rod, wherein a surface at one end of the rod is the sample presenting surface, a strip or a rectangular or circular plate. Furthermore, the substrate can have a thickness of between about 0.1 mm to about 10 cm or more, preferably between about 0.5 mm to about 1 cm or more, most preferably between about 0.8 mm and about 0.5 cm or more. Preferably, the substrate itself is large enough so that it is capable being hand-held. For example, the longest cross dimension of the substrate can be at least about 1 cm or more, preferably about 2 cm or more, most preferably at least about 5 cm or more.

Typically, the probe is adapted for use with inlet ports and detectors of a mass spectrometer. For example, the probe can be adapted for mounting in a horizontally and/or vertically translatable carriage that horizontally and/or vertically moves the probe to a successive position. Such a carriage provides a plurality of features on a probe to be in the path of an energy beam, thereby allowing detection of analytes without requiring repositioning of the probe.

In a preferred embodiment, the probes of this invention are adapted for SELDI. Accordingly, the areas of the surfaces that will form the features can have adsorbents attached that will selectively bind analytes. The adsorbents can he highly specific for an analyte, such as antibodies, or they can be relatively unspecific, such as anion or cation exchange resins. Alternatively, the surface can have energy absorbing molecules or photolabile attachment groups attached. For examples of each see U.S. Pat. No. 5,719,060 (Hutchens & Yip) and WO 98/59361 (Hutchens & Yip).

B. Film

The substrate of the probe of this invention is coated with a film. The purpose of the film is two-fold. First, the film defines the locations where sample is to be placed, also called features. Second, because it has a high water contact angle and less surface tension than the probe surface, the film provides a barrier against the overflow of liquid sample placed on the features.

In order for the film to sequester the liquid sample, it should have less surface tension than the surface of the probe. Generally, the sample will be an aqueous solution. In this case, to perform its function, the film will be hydrophobic. However, this invention contemplates other liquid samples, as well. In this case, the film will be made of a material that does not dissolve in the liquid of the sample. Best results also are obtained when the film has a water contact angle of at least 120° and 180°. Most preferably, the water contact angle is greater than 160°.

The film has a thickness on the probe surface of between 1 angstrom and 1 mm. Preferably, the thickness is between 1 micron and 1000 microns (1 mm.) Most preferably, the film has a thickness of between about 10 microns and 500 microns. A thickness of around 100 microns is particularly useful.

The film coats the surface of the probe in such a way as to leave at least one opening or lacuna in the coating that exposes the surface of the probe. The opening defines a feature where the sample will be applied. Thus, while the film need not coat the entire surface of the probe, it should encircle the opening with sufficient width as to carry out the function of providing a barrier to the spilling over of liquid. Generally, the band of film that encircles the lacuna will be at least 0.3 mm wide and more preferably, at least 1.5 mm wide.

More generally, the film will form a continuous coating over a substantial surface of the probe with a plurality of openings placed throughout the continuous surface. The features preferably are arranged in an orderly fashion, such as a linear, rectangular or circular array for easy addressability.

When the probe is adapted for the surface-enhanced affinity capture version of SELDI, the film generally will surround the features that have the affinity materials attached. Thus, the film acts as a hydrophobic sea surrounding an island of affinity materials.

The film preferably comprises a polymer. For example, the polymer can be selected from perfluorinated hydrocarbons, halogenated hydrocarbons, aliphatic hydrocarbons, aromatic hydrocarbons, polysilanes, organosilanes and combinations thereof. One commercial source for polymer coatings is Cytonix, Beltsville, Md., USA. In other embodiments, the film is a molecular organic material (e.g., a Langmuir-Blodgett film or a self-assembling monolayer, e.g., a decane thiol on gold).

The polymer preferably is a perfluorinated polymer. Exemplary fluorinated polymers include poly(hexafluoropropylene); poly(tetrafluoroethylene) (e.g., Teflon®); poly(trifluoroethylene); poly(vinyl fluoride); poly(vinylidene fluoride); poly((heptafluoroisopropoxy)ethylene); poly(1-((heptafluoroisopropoxy)methyl)propylene-stat-maleic acid); poly(1-heptafluoroisopropoxy)propylene); poly((1-chlorodiflyoromethyl)tetrafluoroethyl acrylate); poly(di(chlorodifluoromethyl)fluoromethyl acrylate); poly(1,1-dihydroheptafluorobutyl acrylate); poly(heptafluoroisopropyl acrylate); poly(2-(heptafluoropropoxy)ethyl acrylate); poly(nonafluoroisobutyl acrylate), and poly(t-nonafluorobutyl methacrylate). One useful fluorinated polymer is described in U.S. Pat. No. 5,853,891 (Brown).

Exemplary halogenated polymers include poly(chlortrifluoroethylene); poly(vinyl chloride); and poly(vinylidene chloride).

Exemplary aliphatic polymers include poly(isobutene); poly(ethylene), poly(isoprene); poly(4-methyl-1-pentene); poly(vinyl butyrate); poly(vinyl dodecanoate); poly(vinyl hexadecanoate); poly(vinyl propionate); poly(vinyl octanoate); poly(methacrylonitrile); poly(vinyl alcohol); and poly(vinyl butyral).

Exemplary epoxy resins include diglycidyl ether of bisphenol-A, 2,3-di(glycidoxy-1,4-phenylene)propane; and diglycidyl ether of bisphenol-A with 0.5% of g-glycidoxypropyltrimethoxy-silane cured with g-glycidoxyproplytrimethoxysilane.

Exemplary aromatic polymers include poly(styrene); poly(2-methyl styrene), poly(xylelene) and phenol-formaldehyde resins such as novolac.

Exemplary polysilanes and organosilanes include poly(oxydiethylsilylene); poly(oxydimehtylsilylene); poly(oxymethylphenylsilylene), condensed methyltrimethoxysilane and condensed g-aminopropyltirethoxysilanes.

The deposition of such polymers is described in, for example, *Characterization of Organic Thin Films;* Ulman, A., Ed.; Manning: Greenwich, 1995 (ISBN 0-7506-9467-X) and *Polymer Handbook, 3rd edition;* Brandrup, J. and Immergut, E. H., Eds.; John Wiley & Sons: New York, 1989 (ISBN 0-471-81244-7).

The surface tension of the polymer generally will be less than 40, preferably less than 30, more preferably less than 20. The surface tension of the polymer can be increased by making it microporous. Microporous films have holes of about 5 microns in size.

Films can be applied to substrates by any method known in the art including for example screen printing, electrospray, ink jet, vapor or plasma deposition or spin coating. To create the features, a lithographic process can be used. This can be done by masking the area prior to deposition or by removing deposited material by etching or burning with an electron, a laser or an ion beam process, or employing a more sophisticated photolithographic process.

III. Methods of Detection

The probes of this invention are useful in the detection of analytes placed on the features of the probe. In these methods, the probes are used in connection with a gas phase ion spectrometer. This includes, e.g., mass spectrometers, ion mobility spectrometers or total ion current measuring devices.

In one embodiment, a mass spectrometer is used with the probe of the present invention. A sample placed on the feature of the probe of the present invention is introduced into an inlet system of the mass spectrometer. The sample is then ionized by an ionization source. Typical ionization sources include, e.g., laser, fast atom bombardment, or plasma. The generated ions are collected by an ion optic assembly, and then a mass analyzer disperses and analyzes the passing ions. The ions exiting the mass analyzer are detected by a detector. The detector then translates information of the detected ions into mass-to-charge ratios. Detection of an analyte will typically involve detection of signal intensity. This, in turn, reflects the quantity of analyte bound to the probe. For additional information regarding mass spectrometers, see, e.g., *Principles of Instrumental Analysis,* 3rd ed., Skoog, Saunders College Publishing, Philadelphia, 1985; and *Kirk-Othmer Encyclopedia of Chemical Technology,* 4th ed. Vol. 15 (John Wiley & Sons, New York 1995), pp. 1071–1094.

In a preferred embodiment, a laser desorption time-of-flight mass spectrometer is used with the probe of the present invention. In laser desorption mass spectrometry, a sample on the probe is introduced into an inlet system. The sample is desorbed and ionized into the gas phase by laser from the ionization source. The ions generated are collected by an ion optic assembly, and then in a time-of-flight mass analyzer, ions are accelerated through a short high voltage field and let drift into a high vacuum chamber. At the far end of the high vacuum chamber, the accelerated ions strike a sensitive detector surface at a different time. Since the time-of-flight is a function of the mass of the ions, the elapsed time between ionization and impact can be used to identify the presence or absence of molecules of specific mass. As any person skilled in the art understands, any of these components of the laser desorption time-of-flight mass spectrometer can be combined with other components described herein in the assembly of mass spectrometer that employs various means of desorption, acceleration, detection, measurement of time, etc.

Furthermore, an ion mobility spectrometer can be used to analyze samples. The principle of ion mobility spectrometry is based on different mobility of ions. Specifically, ions of a sample produced by ionization move at different rates, due to their difference in, e.g., mass, charge, or shape, through a tube under the influence of an electric field. The ions (typically in the form of a current) are registered at the detector which can then be used to identify the sample. One advantage of ion mobility spectrometry is that it can operate at atmospheric pressure.

Still further, a total ion current measuring device can be used to analyze samples. This device can be used when the probe has a surface chemistry that allows only a single type of analytes to be bound. When a single type of analytes is bound on the probe, the total current generated from the ionized analyte reflects the nature of the analyte. The total ion current from the analyte can then be compared to stored total ion current of known compounds. Therefore, the identity of the analyte bound on the probe can be determined.

EXAMPLE

A probe of this invention is constructed as follows. (See FIG. 1.) An aluminum strip 101 having dimensions 80 mm×9 mm×25 mm was prepared. Poly(tetrafluoroethylene) was screen printed on the long surface of a strip to create a film 102. The film covered virtually the entire surface, except for 8 openings in the shape of circles (2.4 mm diameter) defining features 103. An aqueous solution of 3-(methacryloylamino)propyl trimethylammonium chloride (15 wt %), N,N'-methylenebisacrylamide (0.4 wt %), (−)-riboflavin (0.01 wt %) and ammonium persulfate (0.2 wt %) was then deposited onto each opening (0.5 μL per opening). The strip was then irradiated for 5 minutes with a near UV exposure system (Hg short arc lamp, 20 mW/cm2 at 365 nm). This functionalizes the probe surface for binding analytes with ammonium functionalities. After washing the surface once with a solution of sodium chloride (1M) and twice with deionized water, the probe was ready for use.

The present invention provides novel probes for gas phase ion detectors having films on their surfaces that sequester sample. While specific examples have been provided, the above description is illustrative and not restrictive. Many variations of the invention will become apparent to those skilled in the art upon review of this specification. The scope of the invention should, therefore, be determined not with reference to the above description, but instead should be determined with reference to the appended claims along with their full scope of equivalents.

All publications and patent documents cited in this application are incorporated by reference in their entirety for all purposes to the same extent as if each individual publication or patent document were so individually denoted. By their citation of various references in this document Applicants do not admit that any particular reference is "prior art" to their invention.

What is claimed is:

1. A probe that is removably insertable into a laser desorption mass spectrometer comprising:

a) a substrate having a surface adapted to present an analyte to an ionization source and b) a film that coats the surface, wherein the film:

i) comprises at least one opening that exposes the surface, thereby defining a feature for applying a liquid comprising an analyte;

ii) has a water contact angle of between 120° and 180°; and iii) has less surface tension than the substrate surface, whereby a liquid applied to the feature is sequestered in the feature.

2. The probe of claim 1 wherein the film comprises a perfluorinated hydrocarbon, halogenated hydrocarbon, aliphatic hydrocarbon, aromatic hydrocarbon, polysilane, organosilane or combinations thereof.

3. The probe of claim 2 wherein the substrate surface comprises metal.

4. The probe of claim 1 wherein the film comprises a perfluorinated hydrocarbon.

5. The probe of claim 1 wherein the film comprises a plurality of openings arranged in a regular array.

6. The probe of claim 1 wherein the film is electrically conductive.

7. The probe of claims 1–6 wherein an adsorbent comprising a binding functionality is attached to the feature.

8. The probe of claim 7 wherein the binding functionality is selected from the group consisting of a hydropbilic group, a hydrophobic group, an anion exchange resin, a cation exchange resin, a metal chelating group, a dye and a antibody.

9. A system comprising:

a) a laser desorption mass spectrometer comprising an inlet port; and b) a probe of claim 1 inserted into the inlet port.

10. The system of claim 9 wherein the film comprises a perfluorinated hydrocarbon, halogenated hydrocarbon, aliphatic hydrocarbon, aromatic hydrocarbon, polysilane, organosilane or combinations thereof.

11. The system of claim 10 wherein the substrate surface comprises metal.

12. The system of claim 9 wherein the film comprises a perfluorinated hydrocarbon.

13. The system of claim 9 wherein the film comprises a plurality of openings arranged in a regular array.

14. The system of claim 9 wherein the film is electrically conductive.

15. The system of claims 9 and 10–14 wherein an adsorbent comprising a binding flinctionality is attached to the feature.

16. The system of claim 15 wherein the binding functionality is selected from the group consisting of a hydrophilic group, a hydrophobic group, a anion exchange resin, a cation exchange resin, a metal chelating group, a dye and an antibody.

17. A method of detecting an analyte comprising:

a) placing the analyte on a feature of a surface of a probe of claim 1;

b) inserting the probe into an inlet port of a gas phase ion detector comprising:

i) an ionization source that desorbs the analyte from the probe surface into a gas phase and ionizes the analyte; and ii) an ion detector in communication with the probe surface that detects desorbed ions;

c) desorbing and ionizing the analyte with the ionization source; and d) detecting the ionized analyte with the ion detector.

18. The method of claim 17 wherein the film comprises a perfluorinated hydrocarbon, halogented hydrocarbon, aliphatic hydrocarbon, aromatic hydrocarbon, polysilane, organosilane or combinations thereof.

19. The method of claim 18 wherein the substrate surface comprises metal.

20. The method of claim 17 wherein the film comprises a perfluorinated hydrocarbon.

21. The method of claim 17 wherein the film comprises a plurality of openings arranged in a regular array.

22. The method of claim 17 wherein the film is electrically conductive.

23. The method of claims 17 and 18–22 wherein an adsorbent comprising a binding functionality is attached to the feature.

24. The method of claim 23 wherein the binding functionality is selected from the group consisting of a hydrophilic group, a hydrophobic group, an anion exchange resin, a cation exchange resin, a metal chelating group, a dye and an antibody.

* * * * *